(12) United States Patent
Besay

(10) Patent No.: US 8,538,476 B2
(45) Date of Patent: Sep. 17, 2013

(54) CELLULAR NETWORK COMPUTER ADAPTATION SYSTEM

(76) Inventor: Junior Besay, Tamarac, FL (US)

( * ) Notice: Subject to any disclaimer, the term of this patent is extended or adjusted under 35 U.S.C. 154(b) by 501 days.

(21) Appl. No.: 12/580,804

(22) Filed: Oct. 16, 2009

(65) Prior Publication Data

US 2011/0092252 A1    Apr. 21, 2011

(51) Int. Cl.
*H04M 1/00*    (2006.01)
*H04B 1/38*    (2006.01)

(52) U.S. Cl.
USPC ......... 455/556.1; 455/558; 455/418; 455/566

(58) Field of Classification Search
USPC ................ 455/414.1, 550.1, 556.1, 557, 558, 455/566, 575.1, 344, 346, 347, 348, 351, 455/418, 419, 420
See application file for complete search history.

(56) References Cited

U.S. PATENT DOCUMENTS

| | | | |
|---|---|---|---|
| 6,519,252 B2 * | 2/2003 | Sallberg | 370/356 |
| 7,369,851 B2 * | 5/2008 | Okonnen et al. | 455/435.1 |
| 7,865,174 B2 * | 1/2011 | Wood, III | 455/411 |
| 8,045,971 B2 * | 10/2011 | Okkonen et al. | 455/419 |
| 2004/0225800 A1 * | 11/2004 | Lin | 710/301 |
| 2005/0250536 A1 * | 11/2005 | Deng et al. | 455/558 |
| 2008/0132279 A1 * | 6/2008 | Blumenthal | 455/558 |
| 2010/0027467 A1 * | 2/2010 | Wu et al. | 370/328 |

* cited by examiner

*Primary Examiner* — Blane J Jackson
(74) *Attorney, Agent, or Firm* — Michael L. Greenberg, Esq.; Greenberg & Lieberman, LLC

(57) ABSTRACT

A wireless communication system relating to a system for transferring a portable memory chip or other relevant data into a transmission device such that the transmission device can engage a computer to ultimately employ the network plan contained in the portable memory chip for full use on the computer and computer screen. In this manner, the computer will be enabled to perform all tasks of a mobile phone, as well as receive all data contained within the portable memory chip. However, the ability to transmit and receive voice and data communications is contingent upon the access granted through the network plan.

16 Claims, 2 Drawing Sheets

CELLULAR NETWORK COMPUTER ADAPTATION SYSTEM

FIELD OF THE PRESENT INVENTION

The present invention relates to a system for transferring a portable memory chip or other relevant data into a transmission device such that the transmission device can engage a computer to ultimately employ the network plan contained in the portable memory chip for full use on the computer and computer screen.

BACKGROUND OF THE PRESENT INVENTION

The advent of wireless communication and Internet technology has caused a significant change in the way people communicate. Meetings are now just as likely to occur online as they are in person. In addition, people require 24/7-access to the Internet and voice communications. Through it all, people must rely on two important tools—mobile phone and laptop computer.

Mobile phones, also referred to as cellular phones, typically employ some form of a memory chip. Perhaps the most common type of memory chip is the SIM card. The SIM card is the element that stores all of the important personal data such as phone numbers and text messages. However, the SIM card also is the catalyst for linking the mobile phone with a network service plan. Without the network plan, the mobile phone would not be able to be linked with the network, and consequently will be prohibited from sending and receiving calls or messages.

Meanwhile, users also rely on their computers. This is especially true in relation to laptop computers with respect to the current mobile lifestyle of many people. While existing technology makes it so that users can type messages and access the Internet via their mobile phones, it is clear the many people prefer the additional access, keyboard and display screen of a laptop computer. Again, while mobile phones can handle communication tasks, it is on a relatively small scale in literal terms. Computers offer users more traditional and open avenues to operate, as well as easier access to files and a larger display. As such, there is a need to incorporate all aspects of the typical mobile phone with the use of a computer.

This need transcends beyond the existing methodology, and instead relates for the need to include the network data plan with use of a computer. As it stands now, a user must seek a hotspot or even pay for wireless communication when attempting to access the Internet via a laptop computer. This is certainly the case when there is no direct connection to an Internet network. In addition, since the user is at the mercy of the specific network in that zone, the user also must rely on such items as blocked Web sites and other firewalls. Security issues also are prevalent when accessing a strange network.

Currently, methods to circumvent this problem relate to such items as wireless cards. This includes the AIRCARD. Other items include literally plugging a mobile phone into the computer. These existing methods afford the user the ability to access the Internet through their Internet network plan. However, the problem with these methods is that the user typically must pay an additional monthly fee or otherwise pay extra to access these features. Getting more into the actual methodology that these items fail to resolve is the fact that when a phone call comes into the mobile phone, the Internet service is disrupted. The point being that existing devices and methods typically allow for either one or the other. Looking even deeper into the issue is the fact that the mobile phone is required for use in these methods and devices. Because of this, there is a need for a system that allows the user to access both the Internet and voice communication as contained in the memory and network plan of the portable memory chip or SIM card via the computer. The present invention solves this need by allowing a user to remove the memory chip and insert it into a transmission device, which in turn is connected to the computer. In the system and method described below, the user can employ all aspects of the portable memory chip as well as the network plan contained within the portable memory chip.

Moreover, the present invention solves the problem of putting the user into a situation where the provider can force him or her to pay additional fees. This is achieved by establishing a system and method where the user is literally using the same memory chip from the mobile phone, and incorporating it into conjunctive use with the computer via the transmission device. This means that the user can essentially bypass the control of the provider by maintaining the exact same network usage as contained in the regular network plan. So if the user of the present invention has Internet, text messaging and voice on his or her network plan as contained in the portable memory chip or SIM card, then that is exactly what will be converted and displayed on the computer and the computer screen. The aforementioned network cards, phone connection methods, and items such as the OPTION WIRELESS ICON 322 do not satisfy the problems that are solved by the present invention as described herein. Similarly, SIM card reader devices also do not engage in the same type of interaction with a computer or permit the user to employ the network plan contained in the card for full use on the computer and computer screen.

U.S. Patent Application 2004/0225800 filed by Lin on Nov. 11, 2004 is a wireless network card connectable with SIM card. Lin seeks to interface a wireless network card with a SIM card in order to communicate among various wireless systems. Unlike the present invention, Lin is designed for use merely on a connectivity level as opposed to solving the problems as stated above. The present invention, in contrast, effectively incorporates the voice and data plan information as used in the portable memory chip with the computer. In this manner, all data, properties and abilities afforded to the user via the network plan of the portable memory chip are converted and able to use via the actual computer and computer screen.

The existing items noted above share the same fundamental differences from the present invention as other network communications items involving SIM cards. This includes U.S. Patent Application 2008/0132279 filed by Blumenthal on Jun. 5, 2008, which is a software and apparatus item relating to unlicensed mobile access; and U.S. Pat. No. 6,519,252issued to Sallberg on Feb. 11, 2003 which is a system and method for connecting a call to a mobile subscriber connected to the Internet.

The present invention solves the problem relating to bypassing additional fees and relying on other networks or systems in order to access Internet, data and voice communication. There remains nothing out there that incorporates the network plan and information contained in the portable memory chip and transfers it over for full use with a computer and computer screen. As such, the present invention is a system that solves the problem relating to extending a user's current mobile phone network plan to full computer usage.

SUMMARY OF THE PRESENT INVENTION

The present invention is a system for incorporating the data and network plan of a conventional mobile phone into a conventional computing device such as a laptop. The present invention operates by removing a portable memory chip from a mobile phone. The portable memory chip is then placed into a transmission device of the present invention. The transmission device is then plugged into a computer or laptop via conventional means. From there, the user can access the Internet and receive or make telephone calls through the computer and the computer screen.

The transmission device of the present invention serves as a conduit to essentially convert the computer into a cell phone. The transmission device reads the portable memory chip and operates to convert the network data streaming into the transmission device into conventional computer-readable information. The network data that has been converted is then capable of being employed by the computer and the computer's hardware such as speakers, microphones, keyboard, etc. In this manner, the transmission device will receive incoming calls, texts, or other information that is targeted toward the phone number or portable memory chip identifier contact code.

Once the transmission device receives the calls or information, the computer screen and/or speaker will notify the user that a call or information is coming in. From there, the user can decide whether or not to respond or act. If the user does opt to respond, data will be converted and transmitted via the transmission device. Data also will be received and converted by the transmission device, with the network information being gleaned from the portable memory chip. In fact, the portable memory chip dictates the network plan being used, and consequently facilitates the ability to receive and transmit calls and data in the same manner as if the portable memory chip were plugged into the mobile phone.

DETAILED DESCRIPTION OF THE PREFERRED EMBODIMENT

Figure 1:
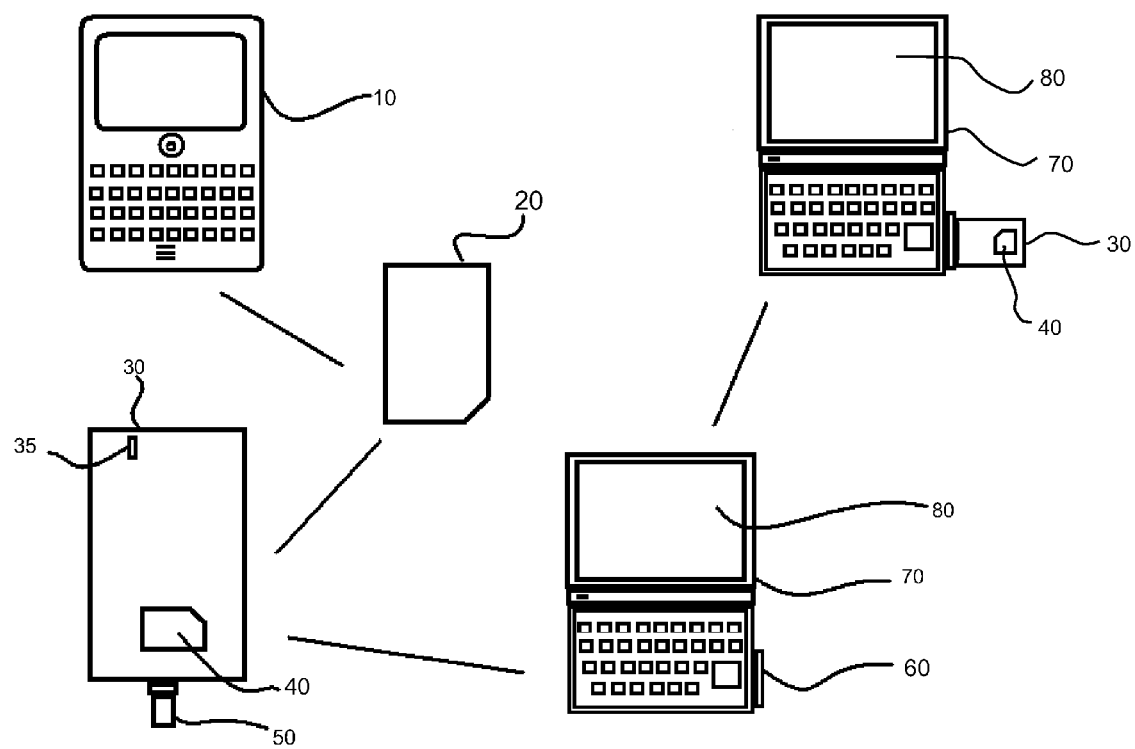
FIG. 1 is a flow chart relating to the hardware of the present invention

The present invention employs the data derived from a portable memory chip in order to allow a user to link a computing device onto a communications network. FIG. 1 offers a general view of the components of the system of the present invention. As we see, the preferred embodiment relates to a mobile phone (10) that uses a portable memory chip (20). The portable memory chip (20) in the preferred embodiment is a subscriber identity module, also referred to as a SIM card. The portable memory chip (20) holds all sorts of relevant data to be used with the present invention. This includes personal identity information, the actual mobile phone number, personalized address and phone book, text messages and other pertinent data. It is to be understood that the portable memory chip (20) of the present invention contains the personal information stored in the mobile phone (10) as well as the network plan data as any other SIM card or conventionally comparable chip used in such communications.

A transmission device (30) also is included into the system of the present invention. The transmission device (30) has a slot (40) that is configured via conventional means for the portable memory chip (20) to fit and be secured. In addition, a port (50) is located on the transmission device (30). The port (50) in the preferred embodiment is configured to fit into a USB input (60) of a computer (70) in order to move data back and forth from the transmission device (30) and the computer (70).

The transmission device (30) also is equipped with conventional transmitting and receiving capabilities that are similar to those of a mobile phone (10). In this manner, the transmission device is configured via conventional means to read and move data contained in the portable memory chip (20) when the portable memory chip (20) is secured into the slot (40). In short, the transmission device (30) is configured to receive and send signals emanating from a network plan contained in the portable memory chip (20). The transmission device (30) is then configured to pass this data through the port (50) and into the computer (70) via the computer's input (60). It is important to note that the ability to send and transmit data by the transmission device (30) is contingent on the network plan as contained in the portable memory chip (20).

As we see in FIG. 1, the transmission device (30) is configured to connect with the computer (70) or laptop (70) at the input (60). The preferred embodiment of the present invention is a USB connection, although it also could be other conventional connectivity elements such as LAN ports, etc. In addition to sending and receiving data as described above, the transmission device (30) also converts the information that runs through the portable memory chip (20) via conventional means into language that the computer (70) understands. The computer (70) will recognize, again via conventional means, the added hardware of the transmission device (30). From the described configuration, the computer display screen (80) will be included in the data being sent and received by the transmission device (30). In this manner, the display screen (80) will provide visual indications of such items as phone calls and text messages that run through the network plan as contained in the portable memory chip (20).

Figure 2:
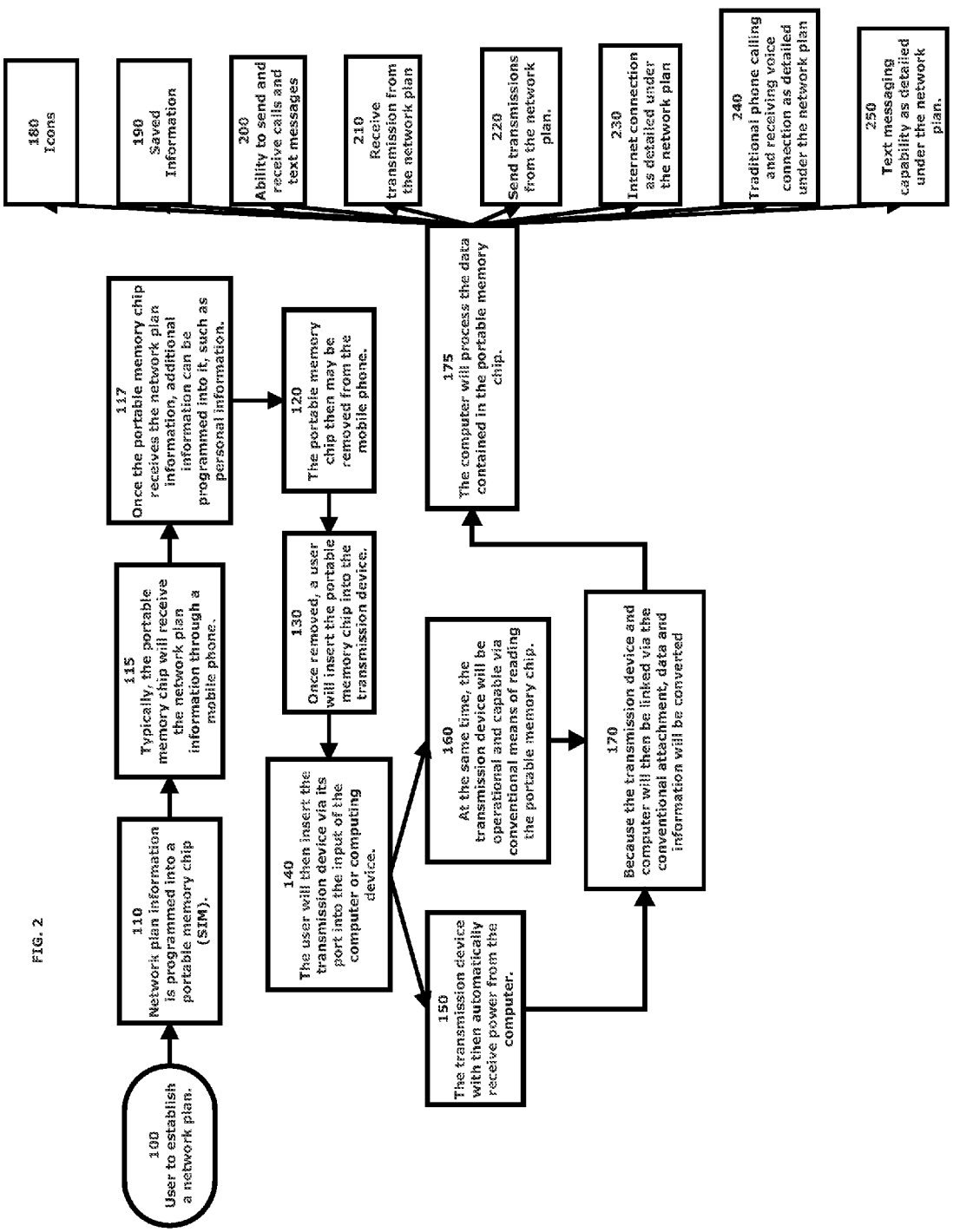
FIG. 2 is a flow chart of the process of the present invention

FIG. 2 is a flow chart of the process of the present invention that operates through the configurations described in FIG. 1. The first step is for the user to establish a network plan (100). The network plan in the preferred embodiment of the present invention is a mobile phone plan that permits the user to pay for Internet and voice services through a carrier. Such network plans are what will actually be billed or permitted for use of the present invention. For example, a user who only has a domestic network plan would be billed for roaming charges if using the present invention internationally. However, the present invention, based on the configurations described in FIG. 1 and the process in FIG. 2, would still operate as described.

Once the user establishes a network plan (100), the network plan information will be programmed into a portable memory chip (110). Typically, the portable memory chip will receive the information through a mobile phone (115). In this manner, the mobile phone operates under conventional means where the user sends and receives calls or data through the network plan contained within the portable memory chip. However, it is important to note that the present invention does not require the actual mobile phone because the portable memory chip is the item that will ultimately be used in conjunction with a network plan.

Once the portable memory chip receives the network plan information, additional information can be programmed (117) into it such as personal information, phone numbers, addresses, calendar items and text messages. The portable memory chip then may be removed from the mobile phone (120). Once removed, a user will insert the portable memory chip into the transmission device (130). As described in FIG. 1, the user will insert the portable memory chip (20) into the slot (40) of the transmission device (30).

Going back to the process of FIG. 2, the user will then insert the transmission device via its port into the input of the computer or computing device (140). The transmission device will then automatically receive power from the computer (150) via conventional means so long as the computer is operational upon the transmission device being inserted. At the same time, the transmission device will be operational and consequently capable via conventional means of reading the portable memory chip (160) in terms of personal information and network plan data. Because the transmission device and computer will then be linked via the conventional attachment, data and information will be converted (170) such that the computer will process this data (175) contained in the portable memory chip. This means that saved information (190), icons (180), and ability to send and receive calls and text messages (200) will be available to the user on the computer display screen, along with other hardware items such as microphones and headsets.

Additionally, the transmission device will operate as described in FIG. 1 to receive transmissions from the network plan (210) based off of the information contained in the portable memory chip, as well as send transmissions from the network plan (220) based off of the information contained in the portable memory chip. The transmissions being sent and received through the network plan and the portable memory chip include Internet connection as detailed under the network plan (230), traditional phone calling and receiving voice connection as detailed under the network plan (240), and text messaging capability as detailed under the network plan (250).

An example of practical use of the present invention is as follows and based off of the system detailed above in FIG. 1 and FIG. 2. A user's network plan may contain unlimited voice/phone minutes during nights and weekends, and a limited number of text messages allotted a day before being charged an amount for each additional text over the limit. In this example, a user may have his or her transmission device (30) connected to a laptop (70) or computer (80) as described above. An icon on the computer display screen (80) may indicate an incoming phone call. The incoming phone call occurred in this manner because the transmission was received by the transmission device (30) pursuant to the network plan contained in the portable memory chip (20). In addition, the indication of an incoming phone call on the display screen (80) will indicate the identity of the caller, as well as other information, so long as that information is contained in the portable memory chip (30). So, if the user saved the photo of the caller in the portable memory chip (30), that photo can be displayed on the computer display screen (80) when a call comes in via the network plan from that number. The user can then choose to answer or ignore the call. If the user answers the call at night and speaks for an hour on this particular network plan via a headset, then the user will be within his or her network plan rules. However, if the user speaks for an hour beginning at noon, then the transmissions between the network plan and the portable memory chip (30) will make it via conventional means that the user's minutes are billed, logged or reduced for that time. Same with text messaging and other plans. An incoming text message will pop onto the display screen (80) of the computer (70) in the manner described above, and the user will be billed if he or she is over the limit, again as described above. At the end of the process as described in FIG. 2, the user may remove the transmission device (30) and remove the portable memory chip (20) from the slot (40) and return the portable memory chip (20) to the mobile phone (10).

Having illustrated the present invention, it should be understood that various adjustments and versions might be implemented without venturing away from the essence of the present invention. The present invention is not limited to the embodiments described above, and should be interpreted as any and all embodiments within the scope of the following claims.

I claim:

1. A wireless communication system, comprising:
    establishing a cellular network plan for a mobile phone account;
    programming the cellular network plan into a portable memory chip;
    inserting the portable memory chip into a mobile phone;
    saving personal information into the portable memory chip via a mobile phone;
    removing the portable memory chip from the mobile phone;
    inserting the portable memory chip into a transmission device;
    fitting a port on the transmission device into a USB port of a computer, the computer connected to the internet via an internet connection other than the cellular network plan;
    linking the transmission device and the computer such that the personal information and the cellular network plan contained in the portable memory chip are converted and processed by the computer;
    receiving incoming data and sending outgoing data that are confined to the cellular network plan as contained in the portable memory chip;
    the computer assuming the role of the mobile phone via the transmission device, including all identities, subscriptions, emails, and messages directed and ascribed to the mobile phone;
    the computer displaying visual indications of caller-id, text message data, and voice information directed to the mobile phone on a display of the computer;
    displaying a photo of a caller stored on the portable memory chip on the display screen upon the transmission device receiving a call from the caller;
    the display screen of the computer visually providing the option to answer or ignore the call via the transmission device;
    the computer sending and receiving calls via the transmission device while using the internet connection other than the cellular network plan so that internet service is not disrupted during calls;
    incorporating use of the display screen and the hardware already installed on the computer with use of the network plan and access to the personal information contained in the portable memory chip.

2. The wireless communication system of claim 1, further comprising the computer functioning identically to a mobile phone via the transmission device, a microphone, and a speaker; and
    the transmission device receiving incoming calls, text messages, and other information that are targeted toward a phone number of the mobile phone.

3. The wireless communication system of claim 1, further comprising inserting the portable memory chip into a slot contained within the transmission device.

4. The wireless communication system of claim 1, further comprising providing power to the transmission device when the transmission device is connected to the computer.

5. The wireless communication system of claim 4, further comprising providing power to the transmission device when the transmission device is connected to the computer, the power causing the transmission device to read the portable memory chip.

6. The wireless communication system of claim 1, further comprising recognizing the transmission device as added hardware operating in communication with the computer.

7. The wireless communication system of claim 6, further comprising accessing Internet via the computer, such access to the Internet granted so long as access is approved by the network plan contained in the portable memory chip.

8. The wireless communication system of claim 7, further comprising incorporating the personal information relating to online usage onto the computer and the display screen of the computer.

9. The wireless communication system of claim 6, further comprising accessing voice communications and text messages via the computer, such access to the voice communications and the text messages granted so long as access is approved by the network plan contained in the portable memory chip.

10. The wireless communication system of claim 9, further comprising incorporating the personal information relating to the voice communications and text message usage onto the computer and the display screen of the computer.

11. The wireless communication system of claim 1, further comprising limiting use of voice communications, the text message usage, and the Internet to permissions granted by the cellular network plan as contained in the portable memory chip.

12. The wireless communication system of claim 1, further comprising allowing the transmission device to receive all incoming data that is targeted toward a phone number contained within the portable memory chip so long as the cellular network plan provides for such receipt of the incoming data.

13. The wireless communication system of claim 1, further comprising allowing the transmission device to transmit all outgoing data that is created via the computer so long as the cellular network plan provides for such transmission of the outgoing data.

14. The wireless communication system of claim 1, further comprising incorporating icons on the display screen of the computer that are in communication with the data contained within the portable memory chip.

15. A wireless communications system, comprising:
  establishing a cellular network plan for a mobile phone account;
  programming the cellular network plan into a portable memory chip;
  saving personal information into the portable memory chip via a mobile phone;
  removing the portable memory chip from the mobile phone;
  inserting the portable memory chip into a transmission device;
  placing the transmission device in communication with a computer;
  fitting a port on the transmission device into a USB port of a computer the computer connected to the internet via an internet connection other than the cellular network plan;
  linking the transmission device and the computer such that the personal information and the network plan contained in the portable memory chip are converted and processed by the computer;
  receiving incoming transmissions and sending outgoing transmissions that are confined to the cellular network plan as contained in the portable memory chip;
  incorporating use of a display screen and hardware already installed on the computer with use of the network plan and access to the personal information contained in the portable memory chip;
  further comprising providing power to the transmission device when the transmission device is connected to the computer;
  further comprising, the power causing the transmission device to read the portable memory chip;
  further comprising recognizing the transmission device as added hardware operating in communication with the computer;
  further comprising passing data between the transmission device and the computer via a port contained on the transmission device and an input on the computer;
  further comprising accessing Internet via the computer, such access to the Internet granted so long as access is approved by the network plan contained in the portable memory chip;
  further comprising incorporating the personal information relating to online usage onto the computer and the display screen of the computer;
  further comprising accessing voice communications and text messages via the computer, such access to the voice communications and the text messages granted so long as access is approved by the cellular network plan contained in the portable memory chip;
  further comprising incorporating the personal information relating to the voice communications and text message usage onto the computer and the display screen of the computer;
  further comprising porting the full functionality of the phone, including voice calls and text messages, to the hardware of the computer via the portable memory chip, such that transmission device receives incoming calls, texts, and chats that are targeted toward the phone, converting the computer into a fully functional phone;
  the computer remaining connected to the internet while the transmission device receives and connects the computer to the incoming call;
  further comprising limiting use of voice communications, the text message usage, and the Internet to permissions granted by cellular network plan as contained in the portable memory chip;
  further comprising allowing the transmission device to receive all incoming data that is targeted toward a phone number contained within the portable memory chip so long as the network plan provides for such receipt of the incoming data;
  further comprising allowing the transmission device to transmit all outgoing data that is created via the computer so long as the network plan provides for such transmission of the outgoing data; and
  further comprising incorporating icons on the display screen of the computer that are in communication with the data contained within the portable memory chip.

16. The method of claim 1, wherein the portable memory chip is configured to contain personal account data and subscription data pertaining to a variety of websites and web applications accessible on the internet connection via the cellular network.

* * * * *